United States Patent [19]

Willis

[11] Patent Number: 4,810,990

[45] Date of Patent: Mar. 7, 1989

[54] TRANSDUCER WITH APERTURES IN TUBULAR CONDUCTOR

[75] Inventor: Christopher A. Willis, Cirencester, England

[73] Assignee: Lucas Industries Public Limited Company, Birmingham, England

[21] Appl. No.: 161,473

[22] Filed: Feb. 18, 1988

[30] Foreign Application Priority Data

Mar. 3, 1987 [GB] United Kingdom ............... 8704900

[51] Int. Cl.$^4$ ............................................. H01F 21/04
[52] U.S. Cl. ........................................ 336/75; 336/87; 336/179
[58] Field of Search ................... 336/130, 136, 75, 77, 336/79, 87, 179

[56] References Cited

U.S. PATENT DOCUMENTS 2,954,538 9/1960 Horgan ........................... 336/75 X
3,400,352 9/1968 Henke ............................. 336/75

Primary Examiner—Thomas J. Kozma
Attorney, Agent, or Firm—Balogh, Osann, Kramer, Dvorak, Genova & Traub

[57] ABSTRACT

A variable inductance transducer includes a winding which is wound about a cylindrical former and a tubular member formed from electrically conductive material which is located about the winding and is movable axially relative thereto. The tubular member is provided with a number of apertures along its length in order to improve the linearity of the transducer.

5 Claims, 1 Drawing Sheet

TRANSDUCER WITH APERTURES IN TUBULAR CONDUCTOR

This invention relates to a variable inductance transducer of the kind including a winding wound upon an elongated cylindrical former and a tubular member formed from electrically conductive material located about the winding and movable axially relative thereto.

As the member moves axially relative to the former and winding the inductance of the winding varies. The winding can form part of the frequency determining network of an oscillator the frequency of which will vary as the member is moved. The variation in the frequency of the oscillator can therefore be used to provide a signal representative of the movement of the member.

A major problem with such a transducer is that the change of inductance for a given movement of the member varies substantially over the range of movement of the member and in practice the range of movement has to be restricted. The object of the present invention is to provide a transducer of the kind specified in an improved form.

According to the invention in a transducer of the kind specified said tubular member is provided with apertures at intervals along its length.

In the preferred arrangement the apertures are in the form of holes drilled or punched into the member at intervals along its length, the intervals being smaller towards the end of the member which remains about the winding as the member is moved. In the example the member is formed from aluminium and is approximately 130 mm long the winding being of substantially the same length. The practical range of relative movement of the winding and the member is approximately 104 mm.

In the accompanying drawings:

FIG. 1 a cross section of part of the transducer,

Figure 1:
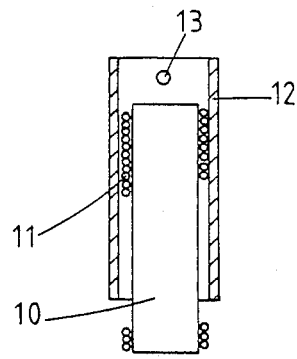
Figure 2:
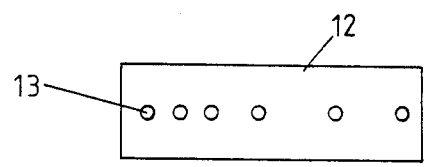
FIG. 2 shows a plan view of part of the transducer of FIG. 1.

As shown in FIG. 1 the transducer comprises a cylindrical former 10 about which is wound a winding 11. The tubular member is indicated at 12 and is movable axially relative to the former from a position in which it fully surrounds the winding. As shown in FIG. 2, the member is provided with a row of apertures in the form of circular holes 13 which are of the same size the intervals between the holes becoming smaller towards the end of the member which remains about the winding as the member is moved.

Figure 3:
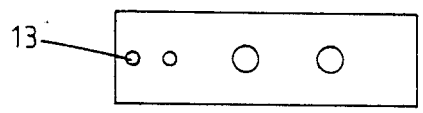
FIGS. 3 and 4 are view similar to FIG. 2 showing alternative forms for the part.
Figure 4:
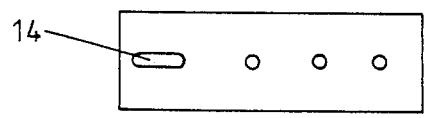

FIG. 3 shows a modification in which the holes are circular but not the same size and FIG. 4 shows that at least some of the apertures can be in the form of a slot 14.

The size and disposition of the apertures depends upon the dimensions of the winding and also the range of relative movement of the winding and tubular member.

In order to provide for temperature compensation, it is proposed to provide an additional winding on a separate former which is exposed to the same temperature as the frequency determining winding and to use the two windings in conjunction with a capacitor, as the frequency determining component of an oscillator. The windings are switched in turn in parallel with the capacitor and the resultant output of the oscillator is supplied to a processing circuit which includes a frequency to voltage converter so that the output voltage is representative of the relative position of the tubular member and the winding. Conveniently the switching of the windings across the capacitor is effected by means of semiconductor switches.

I claim:

1. A variable inductance transducer comprising a winding wound upon an elongated cylindrical former and a tubular member formed from electrically conductive material located about the winding and movable axially relative thereto, said tubular member being provided with apertures at intervals along its length.

2. A transducer according to claim 1 in which the intervals between the apertures become smaller towards the end of the member which remains about the winding as the member is moved.

3. A transducer according to claim 1 in which said apertures are in the form of circular holes.

4. A transducer according to claim 1 in which at least some of said apertures are in the form of slots.

5. A transducer according to claim 2 in which said apertures are in the form of circular holes.

* * * * *